United States Patent
Darkins, Jr. et al.

(10) Patent No.: US 9,228,445 B2
(45) Date of Patent: Jan. 5, 2016

(54) TURBINE AIRFOIL COMPONENTS CONTAINING CERAMIC-BASED MATERIALS AND PROCESSES THEREFOR

(75) Inventors: Toby George Darkins, Jr., Loveland, OH (US); John Peter Heyward, Loveland, OH (US); Eric Alan Estill, Morrow, OH (US); Joshua Brian Jamison, Liberty Township, OH (US); James Herbert Deines, Mason, OH (US); Mark Willard Marusko, Springboro, OH (US); James Thomas Hawkins, Loveland, OH (US)

(73) Assignee: General Electric Company, Schenectady, NY (US)

( * ) Notice: Subject to any disclaimer, the term of this patent is extended or adjusted under 35 U.S.C. 154(b) by 710 days.

(21) Appl. No.: 12/977,299

(22) Filed: Dec. 23, 2010

(65) Prior Publication Data

US 2012/0163978 A1 Jun. 28, 2012

(51) Int. Cl.
*F01D 5/28* (2006.01)
*F01D 5/14* (2006.01)

(52) U.S. Cl.
CPC .............. *F01D 5/284* (2013.01); *F01D 5/147* (2013.01); *Y02T 50/672* (2013.01)

(58) Field of Classification Search
CPC ................................ F01D 5/147; F01D 5/284
USPC .............................................. 416/193 A, 239
See application file for complete search history.

(56) References Cited

U.S. PATENT DOCUMENTS 3,012,308 A * 12/1961 Zech et al. ................. 29/889.7
3,457,066 A 7/1969 Pohlman et al.
3,801,222 A * 4/1974 Violette ..................... 416/220 R
3,810,222 A 5/1974 Nakagawa
4,051,585 A 10/1977 Walker
(Continued)

FOREIGN PATENT DOCUMENTS

EP 1543896 A2 6/2005
EP 1674511 6/2006
(Continued)

OTHER PUBLICATIONS

Office Action issued in connection with corresponding EP Application No. 11193394.1-1362 on Feb. 13, 2013.
(Continued)

*Primary Examiner* — Craig Kim
*Assistant Examiner* — Kayla McCaffrey
(74) *Attorney, Agent, or Firm* — General Electric Company; William Scott Andes (57) ABSTRACT

Hybrid turbine airfoil components containing a ceramic material, in which detailed features of the components are formed of materials other than ceramic materials. The components include a first component formed of a ceramic-based material and a second component formed of a metallic material. The first component comprises an airfoil portion and a nub, and the second component is separately formed and attached to the first component by casting the metallic material around the nub of the first component. The second component includes a platform portion between the airfoil portion and the nub of the first component and a dovetail portion on the nub of the first component. Each of the platform and dovetail portions has at least one off-axis geometric feature that results in the second component having a more complex geometry than the first component.

14 Claims, 10 Drawing Sheets

(56) References Cited

U.S. PATENT DOCUMENTS

| | | | |
|---|---|---|---|
| 4,063,939 A | 12/1977 | Weaver et al. | |
| 4,201,516 A | 5/1980 | Kolk et al. | |
| 4,207,029 A * | 6/1980 | Ivanko | 416/241 B |
| 4,323,394 A | 4/1982 | Hoffmuller | |
| 4,417,854 A * | 11/1983 | Cain et al. | 416/241 B |
| 4,492,737 A * | 1/1985 | Conolly | 428/552 |
| 4,573,876 A | 3/1986 | Egan et al. | |
| 4,650,399 A * | 3/1987 | Craig et al. | 416/97 R |
| 4,728,258 A | 3/1988 | Blazek et al. | |
| 4,849,266 A * | 7/1989 | Dwivedi et al. | 428/34.4 |
| 4,869,645 A | 9/1989 | Verpoort | |
| 4,961,459 A | 10/1990 | Blazek | |
| 5,015,540 A | 5/1991 | Borom et al. | |
| 5,290,143 A | 3/1994 | Kington et al. | |
| 5,318,406 A * | 6/1994 | Bardes | 416/223 A |
| 5,330,854 A | 7/1994 | Singh et al. | |
| 5,336,350 A | 8/1994 | Singh | |
| 5,409,781 A | 4/1995 | Roesler et al. | |
| 5,455,120 A | 10/1995 | Walston et al. | |
| 5,628,938 A | 5/1997 | Sangeeta et al. | |
| 5,797,725 A | 8/1998 | Rhodes | |
| 6,024,898 A | 2/2000 | Steibel et al. | |
| 6,074,602 A | 6/2000 | Wukusick et al. | |
| 6,132,175 A | 10/2000 | Cai et al. | |
| 6,143,432 A | 11/2000 | deRochemont | |
| 6,258,737 B1 | 7/2001 | Steibel et al. | |
| 6,403,158 B1 | 6/2002 | Corman | |
| 6,409,473 B1 | 6/2002 | Chen et al. | |
| 6,503,441 B2 | 1/2003 | Corman et al. | |
| 7,189,459 B2 | 3/2007 | Jackson | |
| 7,284,958 B2 * | 10/2007 | Dundas et al. | 416/193 A |
| 7,387,814 B2 | 6/2008 | Fischer | |
| 7,393,182 B2 | 7/2008 | Matheny | |
| 7,452,182 B2 * | 11/2008 | Vance et al. | 415/135 |
| 7,488,153 B2 * | 2/2009 | Reigl | 415/177 |
| 7,507,466 B2 | 3/2009 | Steibel et al. | |
| 7,546,743 B2 | 6/2009 | Bulman et al. | |
| 7,968,031 B2 | 6/2011 | Carper et al. | |
| 7,972,113 B1 | 7/2011 | Davies | |
| 8,206,118 B2 * | 6/2012 | Propheter-Hinckley et al. | 416/219 R |
| 8,231,354 B2 * | 7/2012 | Campbell et al. | 416/193 A |
| 8,251,651 B2 | 8/2012 | Propheter-Hinckley | |
| 2004/0067316 A1 | 4/2004 | Gray et al. | |
| 2004/0112564 A1 | 6/2004 | Devine et al. | |
| 2005/0158171 A1 | 7/2005 | Carper et al. | |
| 2005/0186069 A1 | 8/2005 | Subramanian et al. | |
| 2005/0276688 A1 | 12/2005 | Roth-Fagaraseanu | |
| 2006/0283014 A1 | 12/2006 | Subramanian et al. | |
| 2007/0048144 A1 | 3/2007 | Morrison et al. | |
| 2007/0122266 A1 | 5/2007 | Cairo et al. | |
| 2009/0060747 A1 | 3/2009 | Strock | |
| 2010/0024216 A1 | 2/2010 | DeSander et al. | |
| 2010/0054930 A1 | 3/2010 | Morrison | |
| 2011/0244303 A1 | 10/2011 | Rahmane | |

FOREIGN PATENT DOCUMENTS

| | | |
|---|---|---|
| EP | 1914030 A1 | 4/2008 |
| JP | 48100513 A | 12/1973 |
| JP | 61222964 A | 10/1986 |
| JP | 61249658 A | 11/1986 |
| JP | 6241902 | 2/1987 |

OTHER PUBLICATIONS

Final Rejection towards corresponding U.S. Appl. No. 12/978,679 dated Dec. 30, 2013.

Unofficial English Translation of Japanese Office Action issued in connection with corresponding JP Application No. 2011279309 on Jun. 30, 2015.

EP Search Report issued on Nov. 16, 2015 in relation to corresponding EP application 11194673.7.

* cited by examiner

TURBINE AIRFOIL COMPONENTS CONTAINING CERAMIC-BASED MATERIALS AND PROCESSES THEREFOR

BACKGROUND OF THE INVENTION

The present invention generally relates to ceramic-based articles and processes for their production. More particularly, this invention is directed to ceramic-based articles produced to include metallic regions that define detailed features, for example, dovetails, shanks, platform features and tip shrouds of gas turbine airfoil components.

Higher operating temperatures for gas turbines are continuously sought in order to increase their efficiency. Though significant advances in high temperature capabilities have been achieved through formulation of iron, nickel and cobalt-base superalloys, alternative materials have been investigated. Ceramic materials are a notable example because their high temperature capabilities can significantly reduce cooling air requirements. As used herein, ceramic-based materials encompass homogeneous ceramic materials as well as ceramic matrix composite (CMC) materials. CMC materials generally comprise a ceramic fiber reinforcement material embedded in a ceramic matrix material. The reinforcement material may be discontinuous short fibers dispersed in the matrix material or continuous fibers or fiber bundles oriented within the matrix material. The reinforcement material serves as the load-bearing constituent of the CMC in the event of a matrix crack. In turn, the ceramic matrix protects the reinforcement material, maintains the orientation of its fibers, and serves to dissipate loads to the reinforcement material. Silicon-based composites, such as silicon carbide (SiC) as the matrix and/or reinforcement material, are of particular interest to high-temperature applications, for example, high-temperature components of gas turbines including aircraft gas turbine engines and land-based gas turbine engines used in the power-generating industry.

Continuous fiber reinforced ceramic composites (CFCC) are a type of CMC that offers light weight, high strength, and high stiffness for a variety of high temperature load-bearing applications, including shrouds, combustor liners, vanes (nozzles), blades (buckets), and other high-temperature components of gas turbines. A notable example of a CFCC has been developed by the General Electric Company under the name HiPerComp®, and contains continuous silicon carbide fibers in a matrix of silicon carbide and elemental silicon or a silicon alloy. SiC fibers have also been used as a reinforcement material for a variety of other ceramic matrix materials, including titanium carbide (TiC), silicon nitride ($Si_3N_4$), and alumina ($Al_2O_3$).

Examples of CMC materials and particularly SiC/Si—SiC (fiber/matrix) CFCC materials and processes are disclosed in U.S. Pat. Nos. 5,015,540, 5,330,854, 5,336,350, 5,628,938, 6,024,898, 6,258,737, 6,403,158, and 6,503,441, and U.S. Patent Application Publication No. 2004/0067316. One such process is known as "prepreg" melt-infiltration (MI), which in general terms entails the fabrication of CMCs using multiple prepreg layers, each in the form of a tape-like structure comprising the desired reinforcement material and a precursor of the CMC matrix material, as well as one or more binders and typically carbon or a carbon source. The prepreg must undergo processing (including firing) to convert the precursor to the desired ceramic. Prepregs for CFCC materials frequently comprise a two-dimensional fiber array comprising a single layer of unidirectionally-aligned tows impregnated with a matrix precursor to create a generally two-dimensional laminate.

Figure 1:
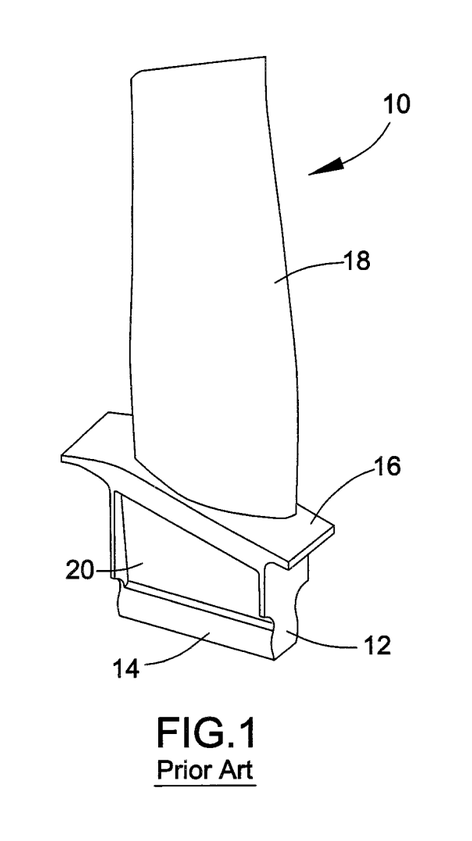
FIG. 1 is a perspective view schematically representing a turbine blade of a type formed of CMC materials in accordance with the prior art.

For purposes of discussion, a low pressure turbine (LPT) blade 10 of a gas turbine engine is represented in FIG. 1. The blade 10 is an example of a component that can be produced from a ceramic-based material, including CMC materials. The blade 10 is generally represented as being of a known type and adapted for mounting to a disk or rotor (not shown) within the turbine section of an aircraft gas turbine engine. For this reason, the blade 10 is represented as including a dovetail 12 for anchoring the blade 10 to a turbine disk by interlocking with a complementary dovetail slot formed in the circumference of the disk. As represented in FIG. 1, the interlocking features comprise protrusions referred to as tangs 14 that engage recesses defined by the dovetail slot. The blade 10 is further shown as having a platform 16 that separates an airfoil 18 from a shank 20 on which the dovetail 12 is defined. The blade 10 may be further equipped with a blade tip shroud (not shown) which, in combination with tip shrouds of adjacent blades within the same stage, defines a band around the blades that is capable of reducing blade vibrations and improving airflow characteristics. By incorporating a seal tooth, blade tip shrouds are further capable of increasing the efficiency of the turbine by reducing combustion gas leakage between the blade tips and a shroud surrounding the blade tips.

Because they are directly subjected to hot combustion gases during operation of the engine, the airfoil 18, platform 16 and tip shroud have very demanding material requirements. The platform 16 and blade tip shroud (if present) are further critical regions of a turbine blade in that they create the inner and outer flowpath surfaces for the hot gas path within the turbine section. In addition, the platform 16 creates a seal to prevent mixing of the hot combustion gases with lower temperature gases to which the shank 20, its dovetail 12 and the turbine disk are exposed, and the blade tip shroud is subjected to creep due to high strain loads and wear interactions between its seal tooth (if present) and the shroud surrounding the blade tips. The dovetail 12 is also a critical region in that it is subjected to wear and high loads resulting from its engagement with a dovetail slot and the high centrifugal loading generated by the blade 10.

Current state-of-the-art approaches for fabricating ceramic-based turbine blades have involved integrating the platform 16, dovetail 12, airfoil 18 and tip shroud (if present) as one piece during the manufacturing process, much like conventional investment casting techniques currently used to make metallic blades. However, the platform 16, dovetail 12, tangs 14 and tip shroud represent detailed geometric features of the blade 10 that pose substantial challenges to designing, manufacturing and integrating CMC components into an affordable, producible design for turbine applications. For example, the process of integrating a platform 16 and tip shroud with the airfoil 18 using CMC materials creates complexities in the design and manufacturing process, and can result in a process that can be too expensive to be economically practical. Furthermore, the platform 16, dovetail 12 and its tangs 14 have interface/support functions that can require structural interface capabilities that can be difficult to achieve with CMC materials. In addition, the low strain-to-failure capabilities of typical CMC materials and the possibility of undesirable wear interactions between tip shroud seal teeth and conventional shrouding materials pose additional challenges to implementing CMC materials in shrouded blade designs.

BRIEF DESCRIPTION OF THE INVENTION

The present invention provides hybrid turbine airfoil components containing a ceramic material, in which detailed features of the components are formed of materials other than ceramic materials, yet result in a robust mechanical attachment of the ceramic and non-ceramic portions of the components.

According to a first aspect of the invention, a turbine airfoil component includes a first subcomponent formed of a ceramic-based material and a second subcomponent formed of a metallic material. The first subcomponent comprises an airfoil portion and a nub, and the second subcomponent is separately formed and attached to the first subcomponent by casting the metallic material around the nub of the first subcomponent. The second subcomponent includes a platform portion between the airfoil portion and the nub of the first subcomponent and a dovetail portion on the nub of the first subcomponent. Each of the platform and dovetail portions has at least one off-axis geometric feature that results in the second subcomponent having a more complex geometry than the first subcomponent.

In view of the above, it can be seen that a technical effect of this invention is the ability to produce certain portions of a turbine airfoil component from a ceramic-based material, while producing other portions of the component having intricate geometric details from materials that do not require the temperature capability of ceramic-based materials. The invention is particularly beneficial for applications in which the intricate geometric details formed of the non-ceramic material are interface/supporting features that require structural interface capabilities, and as a result of being fabricated from a non-ceramic material are not nearly as labor intensive or require the level of skilled labor that would be required if the entire component were fabricated from a ceramic-based material.

Other aspects and advantages of this invention will be better appreciated from the following detailed description.

DETAILED DESCRIPTION OF THE INVENTION

The present invention will be described in terms of processes for producing components containing ceramic-based materials, including homogeneous ceramic materials and CMC materials that may contain discontinuous and/or continuous fiber reinforcement materials. While various applications are foreseeable and possible, applications of particular interest include are high temperature applications, for example, components of gas turbines, including land-based and aircraft gas turbine engines. Furthermore, specific reference will be made to airfoil components, including turbine blades and vanes for use within the turbine sections of a gas turbine engine. While the invention is applicable to a wide variety of ceramic-based materials, ceramic-based materials of particular interest to the invention are believed to be CMC materials containing silicon, such as CMC's containing silicon carbide as the reinforcement and/or matrix material, for example, continuous silicon carbide fibers in a matrix of silicon carbide. However, other ceramic-based materials are also within the scope of the invention.

Figure 2:
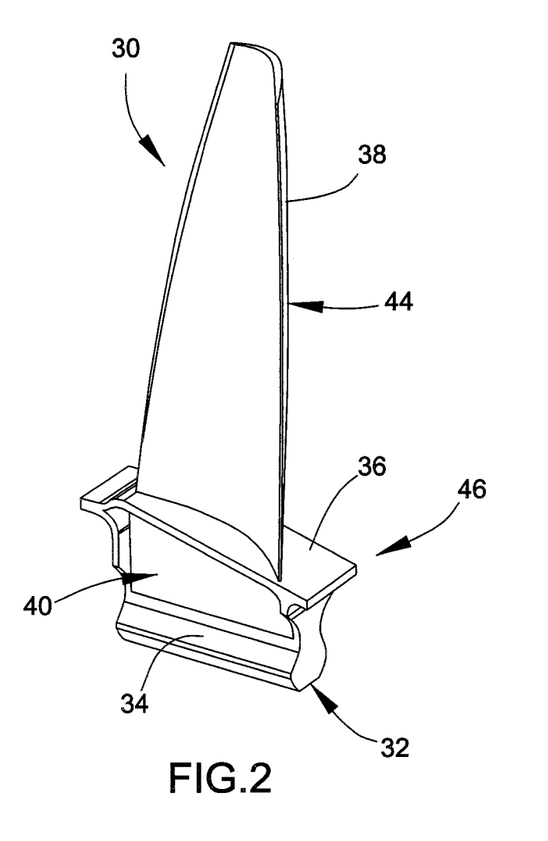
FIG. 2 is a perspective view schematically representing a turbine blade having an airfoil portion formed of a CMC material and platform and dovetail portions formed of a metallic material in accordance with an embodiment of the present invention.
Figure 3:
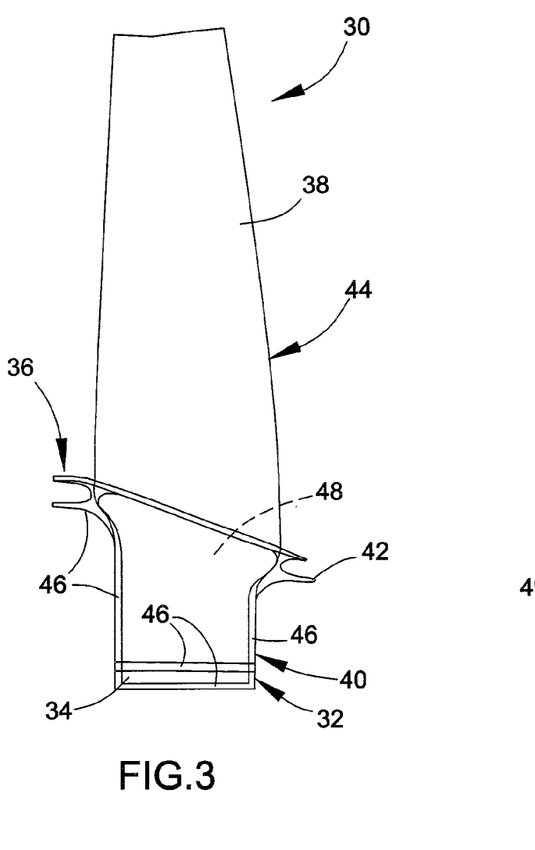
FIG. 3 is a side view schematically representing the turbine blade of FIG. 2, and showing the airfoil portion as having an integral shank nub within a shank portion of the blade that comprises the platform and dovetail portions in accordance with an embodiment of the present invention.
Figure 16:
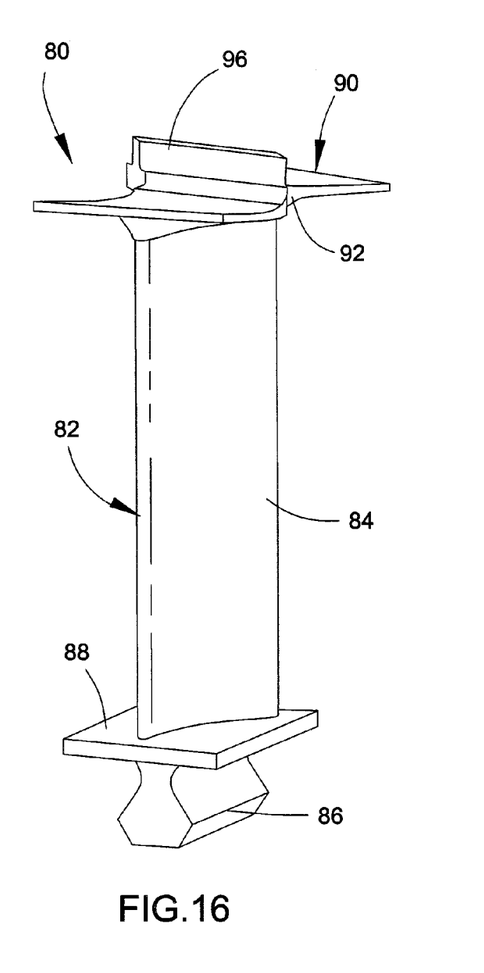
FIG. 16 is a perspective view schematically representing a turbine blade having an airfoil portion formed of a CMC material and platform, dovetail and tip shroud portions formed of metallic materials in accordance with another embodiment of the present invention.
Figure 17:
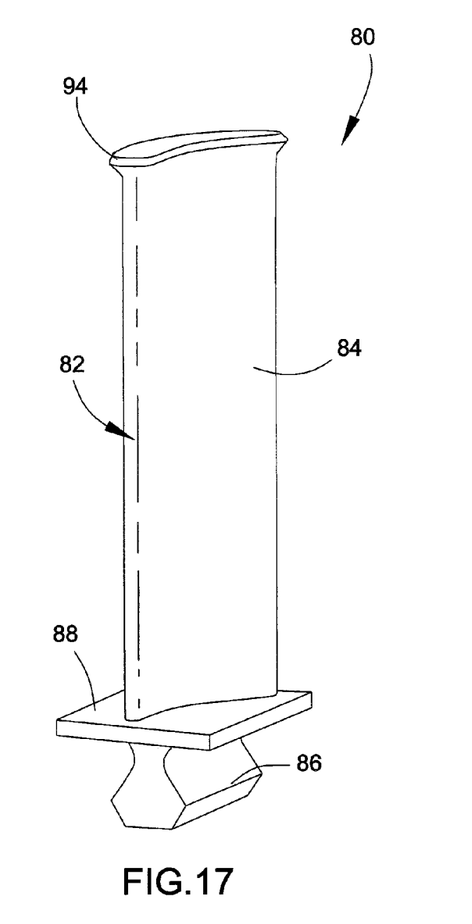
FIG. 17 is an isolated perspective view of the turbine blade of FIG. 17, showing the airfoil portion as having integral shank and blade tip nubs.

FIGS. 2 and 3 represent a low pressure turbine (LPT) blade 30 of a type used in an aircraft gas turbine engine. Similar to the prior art blade 10 of FIG. 1, the blade 30 represented in FIGS. 2 and 3 is adapted for mounting to a disk or rotor (not shown) within the turbine section of a gas turbine engine. For this reason, the blade 30 is represented as including a dovetail portion 32 for anchoring the blade 30 to a turbine disk. The dovetail portion 32 is configured to interlock with a complementary dovetail slot formed in the circumference of the disk. As represented in FIGS. 2 and 3, the interlocking features comprise oppositely-disposed tangs 34 that protrude from the dovetail portion 32 for engagement with recesses defined by the disk dovetail slot. The blade 30 is further shown as having a platform portion 36 that separates an airfoil portion 38 from a shank portion 40 on which the dovetail portion 32 is defined. Depending on its particular application and the rotor disk (not shown) on which the blade 30 is to be assembled, the blade 30 may comprise additional features, for example, angelwings 42 on its shank portion 40 and a shroud at its blade tip (for example, as represented in FIGS. 16 and 17).

Similar to what was described for the blade 10 of FIG. 1, the airfoil portion 38 and platform portion 36 are directly exposed to hot combustion gases during operation of the engine, and the platform portion 36 is a critical region of the blade 30 in that it creates the inner flowpath surface of the hot gas path for the hot combustion gases, and creates a seal to prevent mixing of the combustion gases with lower temperature gases internal to the rotating system and to which the shank portion 40, its dovetail portion 32 and the turbine disk are exposed. In addition, the dovetail portion 32 is subjected to wear and high loads as a result of its engagement with the disk dovetail slot and the high centripetal loading generated by the blade 30.

The airfoil portion 38 of the blade 30 is an excellent candidate for being produced from a ceramic-based material, and especially a CMC material, because it is directly exposed to the hot combustion gases and has a generally linear geometry. On the other hand, the platform portion 36, dovetail portion 32 and its tangs 34 have more complex geometries than the airfoil portion 38, in the sense that the airfoil portion 38 has a generally linear geometry along its dominant axis, whereas the dovetail and platform portions 32 and 36 define geometric features oriented transverse to each of their dominant axes. Furthermore, these off-axis geometric features are detailed interface/supporting features of the blade 30, and therefore require structural interface capabilities that pose substantial challenges to designing, manufacturing and integrating a completely CMC blade (such as the blade 10 of FIG. 1) into an affordable, producible design for turbine applications. The present invention provides a process for taking advantage of the high-temperature capabilities of CMC materials, while avoiding the difficulties of producing complicated geometries from CMC materials. In particular, the present invention involves producing the airfoil portion 38 and a nub 48 of the shank portion 40 as a unitary piece from a CMC material, and producing one or both of the platform portion 36 and dovetail portion 32 from materials other than the CMC material used to produce the unitary airfoil portion 38 and shank nub 48.

As used herein, the term shank nub refers to a limited portion, preferably an interior region, of the entire shank portion 40, which further includes the dovetail portion 32 and its tangs 34. As represented in FIG. 3, the shank nub 48 is entirely encased in the material used to form the platform portion 36 and dovetail portion 32. In addition, the shank nub 48 can be referred to as being "defeatured," in that the detailed dovetail features conventionally required for a shank (such as the dovetail 12 and tangs 14 of the shank 20 of FIG. 1) can be completely omitted from the shank nub 48 shown in FIGS. 2 and 3.

As a ceramic-based material, the unitary airfoil portion 38 and shank nub 48 can be produced by known ceramic processes. For example, the unitary airfoil portion 38 and shank nub 48 can be CMC materials fabricated from prepregs. Nonlimiting examples include the processes disclosed in U.S. Pat. Nos. 5,015,540, 5,330,854, 5,336,350, 5,628,938, 6,024,898, 6,258,737, 6,403,158, and 6,503,441, and U.S. Patent Application Publication No. 2004/0067316. As a particular example, the unitary airfoil portion 38 and shank nub 48 can be fabricated by the previously-described prepreg melt-infiltration (MI) process, wherein multiple prepregs are formed to contain the desired reinforcement material and a precursor of the CMC matrix material, as well as one or more binders and, depending on the particular desired CMC material, possibly carbon or a carbon source. The prepregs undergo lay-up, are debulked and cured while subjected to elevated pressures and temperatures, and subjected to any other suitable processing steps to form a laminate preform. Thereafter, the laminate preform may be heated in a vacuum or an inert atmosphere to decompose the binders and produce a porous preform that is then melt infiltrated. If the CMC material contains a silicon carbide reinforcement material in a ceramic matrix of silicon carbide (a SiC/SiC CMC material), molten silicon is typically used to infiltrate into the porosity, react with a carbon constituent (carbon, carbon source, or carbon char) within the matrix to form silicon carbide, and fill the porosity. However, it will be apparent from the following discussion that the invention also applies to other types and combinations of CMC materials.

Figure 4:
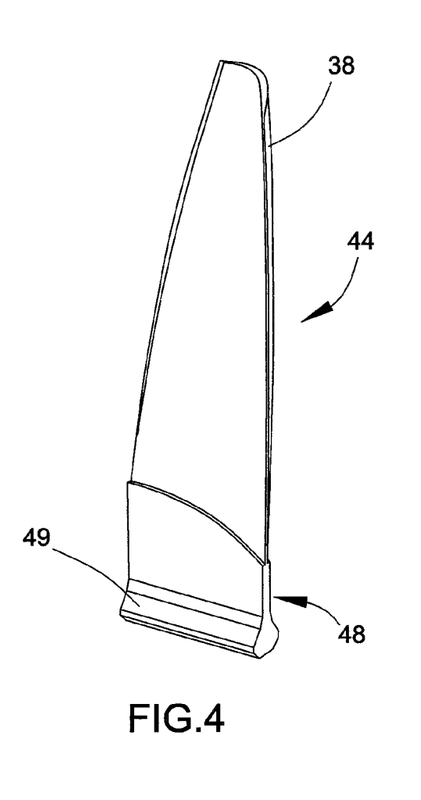
FIGS. 4 and 5 are isolated perspective views of the integral airfoil portion and shank nub and the integral platform and dovetail portions of the turbine blade of FIGS. 2 and 3.

Because of the generally linear geometry of the airfoil portion 38 and shank nub 48, the required lay-up process is not nearly as labor intensive and does not require the level of skilled labor that would be required if the entire blade 30 were to be fabricated from prepregs. FIG. 4 represents an example of a unitary CMC subcomponent 44 that comprises the airfoil portion 38 and shank nub 48, is entirely formed of a CMC material, and can be produced by a CMC process such as that described above. As represented, the shank nub 48 comprises an enlarged knob or base 49 that is wider in cross-section than the region of the nub 48 adjacent the root of the airfoil portion 38. This uncomplicated feature can also be formed with the CMC process, and is desirable for assisting in the retention of the dovetail portion 32 of the blade 30.

Figure 5:
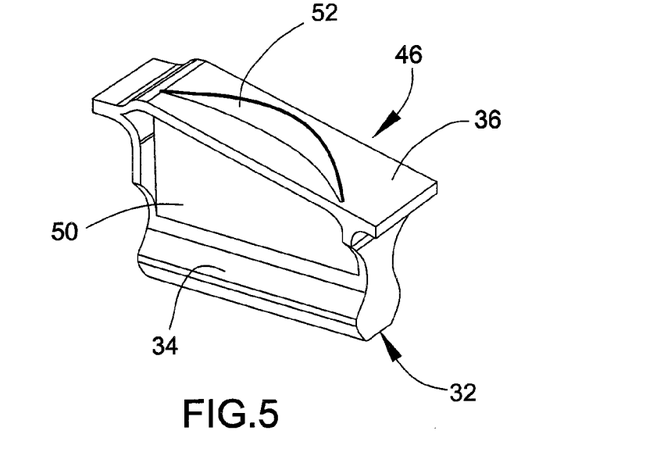

Though the drive for additional turbine engine performance has prompted the desire for using CMC materials due to increased gas path temperatures, those regions of blades (and other turbine components) that are not directly exposed to the hot combustion gases, including the dovetail, platform and shank portions 32, 36 and 40 of the blade 30, may utilize materials with lower temperature capabilities, for example, nickel-, cobalt- or iron-based alloys currently available and used in turbomachinery. Notable but nonlimiting examples include such superalloys as IN (Inconel) 718, René N5 (U.S. Pat. No. 6,074,602), René N6 (U.S. Pat. No. 5,455,120), GTD-444®, René 77 (U.S. Pat. No. 3,457,066), René 80, René 80H and René 125. FIG. 5 represents a unitary subcomponent 46 that, in combination with the CMC subcomponent 44 of FIG. 4, preferably yields the complete blade 30 of FIGS. 2 and 3. According to a preferred aspect of the invention, the subcomponent 46 is formed of one or more of the aforementioned metal alloy materials. The utilization of a superalloy to form the dovetail, platform and shank portions 32, 36 and 40 of the blade 30 addresses numerous producibility limitations that exist with current state of the art CMC processes, and also allows for the use of known lifting methodologies and analytical tools to verify suitable designs for the blade 30 and particularly the detailed interface/supporting features of the blade 30, which in FIGS. 2 and 3 are represented by the platform portion 36, dovetail portion 32 and its tangs 34.

As evident from the CMC subcomponent 44 seen in FIG. 4, the subcomponent 46 of FIG. 5 is not configured to be prefabricated and then assembled with the CMC subcomponent 44 by inserting the shank nub 48 into a complimentary cavity 52 defined in the subcomponent 46, though such an approach is not outside the scope of the invention. Instead, one approach that has been developed during investigations leading to this invention involves forming the subcomponent 46 by casting metallic material around the shank nub 48 of the CMC subcomponent 44. This approach is practical in view of typical CMC materials having higher processing temperatures than the casting temperatures of a wide range of metallic materials suitable for forming the metallic subcomponent 46, which therefore allows the merging of established metallic casting processes with the CMC subcomponent 44. As a result, the prior necessity to fabricate the entire blade 30 from a CMC material is avoided, as are the difficulties encountered when trying to produce intricate shank geometric details in a production environment, as well as the difficulties encountered when attempting to analyze and correlate in-service operational conditions of an all-CMC blade. Instead, all of the detailed features of the blade 30, and particularly the details associated with its dovetail, platform and shank portions 32, 36 and 40, can be produced by machining the as-cast metallic material using existing manufacturing techniques.

In view of the above, a metallic material can be cast around the shank nub 48 of the simplified, de-featured CMC subcomponent 44, to produce the entire unitary metallic subcomponent 46, which in effect is an overlaying metal casing that defines the dovetail portion 32 and its tangs 34, as well as what will be referred to as a shank casing 50 that encases the portion of the shank nub 48 above the dovetail portion 32 of the subcomponent 46. In FIGS. 2, 3 and 5, the unitary metallic subcomponent 46 is further represented as defining the platform portion 36, such that the shank casing 50 is disposed between the dovetail and platform portions 32 and 36. Additional features can also be defined by the metallic subcomponent 46, including the angelwings 42 extending from the shank casing 50.

Because the coefficient of thermal expansion (CTE) of metallic materials that can be used to form the cast metallic dovetail portion 36 and shank casing 50 is typically higher than the CTE of typical CMC materials, during solidification of the metallic material around the CMC shank nub 48 the cast metallic material that defines the cavity 52 will contract more than the CMC material and compress the shank nub 48, providing a compression fit and tight encapsulation of the CMC nub 48 and retention of the CMC subcomponent 44 to the metallic subcomponent 46, which is in addition to the retention capability provided as a result of the subcomponent 46 surrounding the enlarged base 49 of the shank nub 48. As a nonlimiting example, a suitable compression fit is believed to be achievable with a metallic material such as the aforementioned nickel-based superalloy René 80H, which has a CTE of about 14 ppm/° C., in comparison to a CTE of about 4 ppm/° C. for SiC—SiC CMC materials. This CTE differential is capable of yielding a strain of about 1% when cooled to room temperature from a casting temperature of about 2200° F. (about 1200° C.), resulting in a room temperature stress state in which the CMC shank nub 48 is in compression and the metallic subcomponent 46 surrounding the nub 48 is in tension. Particularly for blades whose dovetails are in compression during operation, the shrink-fit resulting from the casting process is capable of providing a robust mechanical attachment.

Figure 6:
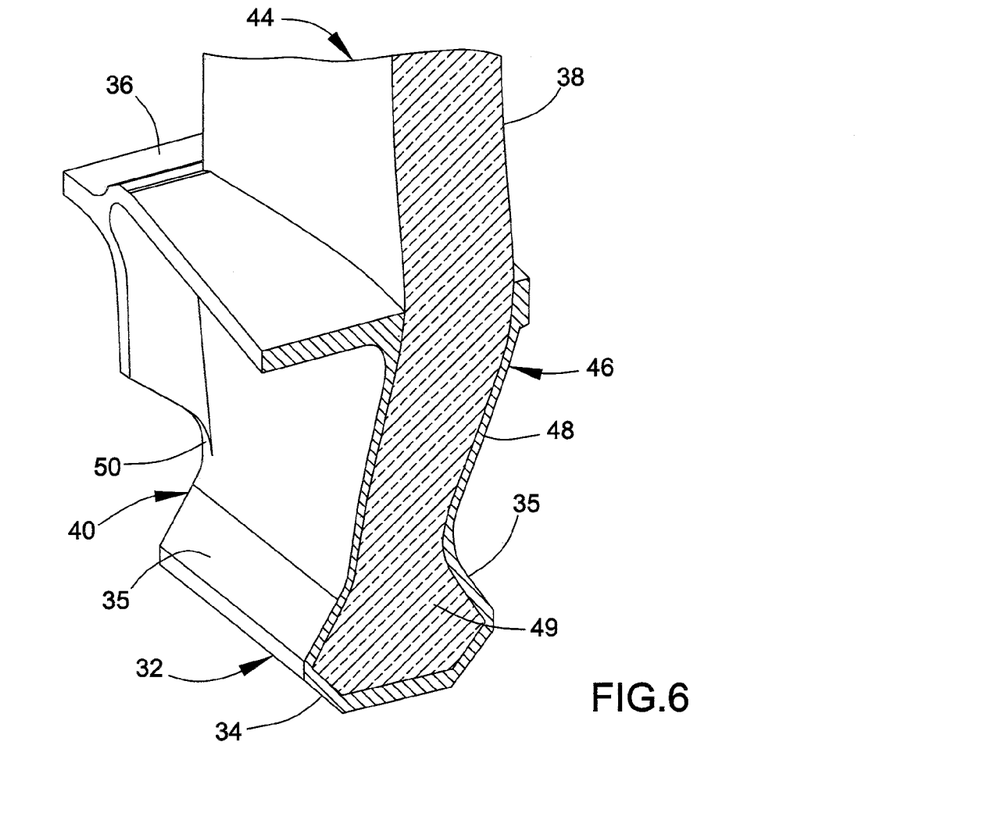
FIG. 6 is a perspective view showing a cross-section of the integral platform and dovetail portions of the turbine blade of FIGS. 2 and 3.
Figure 7:
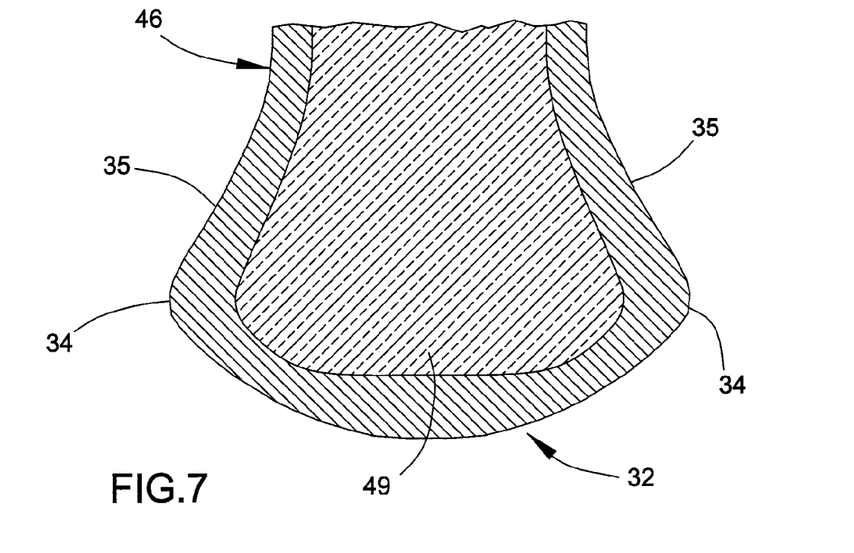
FIG. 7 is a more detailed cross-sectional view of the dovetail portion represented in FIG. 6.
Figures 8, 9, 10:
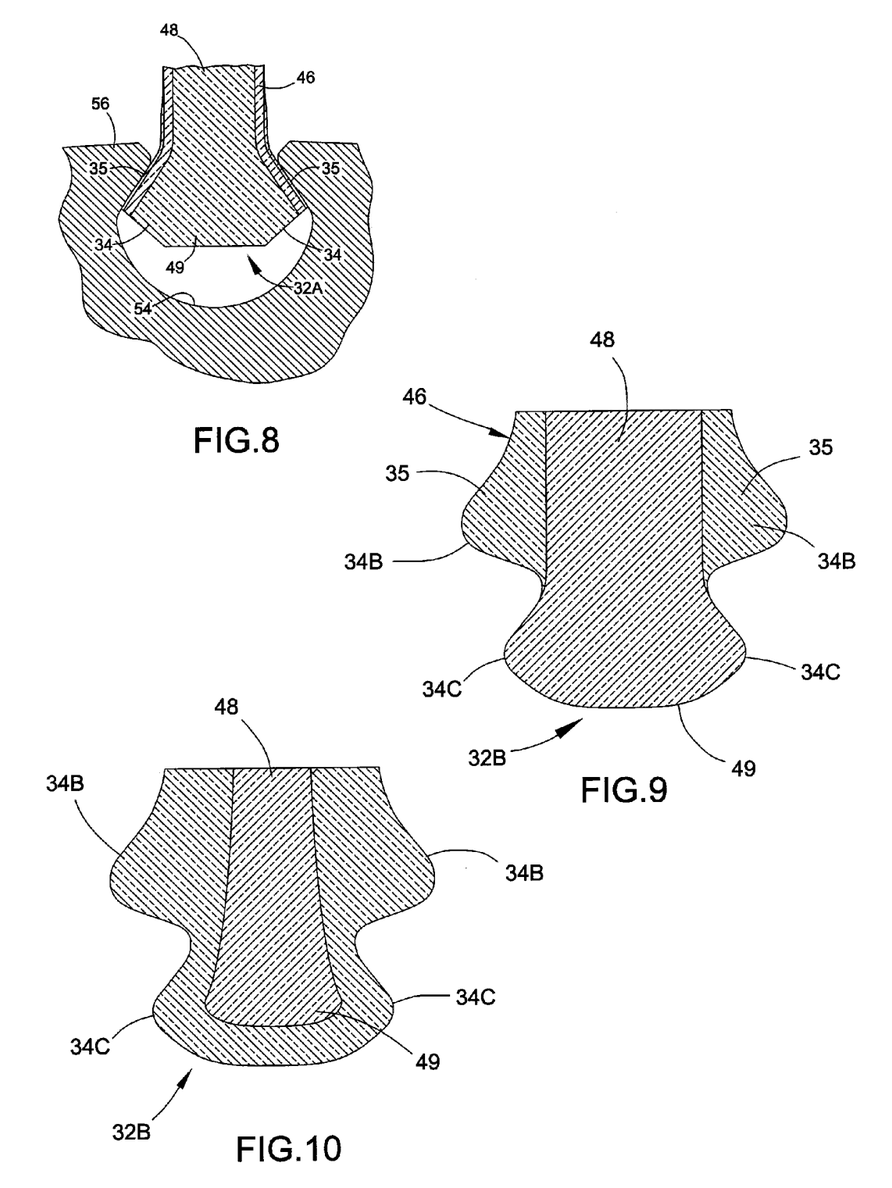
FIGS. 8, 9 and 10 are detailed cross-sectional views showing dovetail portions in accordance with other embodiments of the present invention.

FIG. 6 is a perspective view showing a cross-section of the blade 30 in the region of the interface between its subcomponents 44 and 46, evidencing in more detail the manner in which the metallic subcomponent 46 can be used to completely encase the shank nub 48, including its base 49. FIG. 7 is a detailed end view of the dovetail portion 32 represented in FIG. 6, evidencing how the metallic subcomponent 46 fully encases the base 49 of the shank nub 48, and in doing so defines pressure faces 35 that will engage surfaces of the disk dovetail slot in which the blade 30 is to be installed. FIG. 8 is a similar end view showing a blade dovetail portion 32A installed in a disk dovetail slot 54 of a turbine rotor disk 56. The dovetail portion 32A is similar to the dovetail portion 32 of FIGS. 2-7, but differs in that the metallic material has not been cast to cover the lower surface of the shank nub base 49. Instead, the subcomponent 46 covers the shank nub base 49 to the extent necessary to define the pressure faces 35. FIG. 9 is a view similar to the view depicted in FIG. 7, but depicts a dovetail portion 32B having multiple sets of tangs 34B and 34C instead of the single set of tangs 34 depicted in FIGS. 2-8. Furthermore, the metallic material has not been cast to cover any part of the shank nub base 49. Instead, the subcomponent 46 covers surfaces of the shank nub 48 above its base 49 so that the metallic subcomponent 46 is cast to define the tangs 34B and the pressure faces 35 of the dovetail portion 32 in their entirety. The base 49, in effect, defines the lower set of tangs 34C in their entirety, which are subjected to lower loads (if any) due to the reliance of the pressure faces 35 defined by the upper set of tangs 34C. Finally, FIG. 10 is similar to FIG. 9, but depicts metallic material as having been cast to cover the entire shank nub base 49, with the result that the metallic subcomponent 46 defines the dovetail portion 32B and both sets of tangs 34B and 34C in their entirety.

Figures 11, 12:
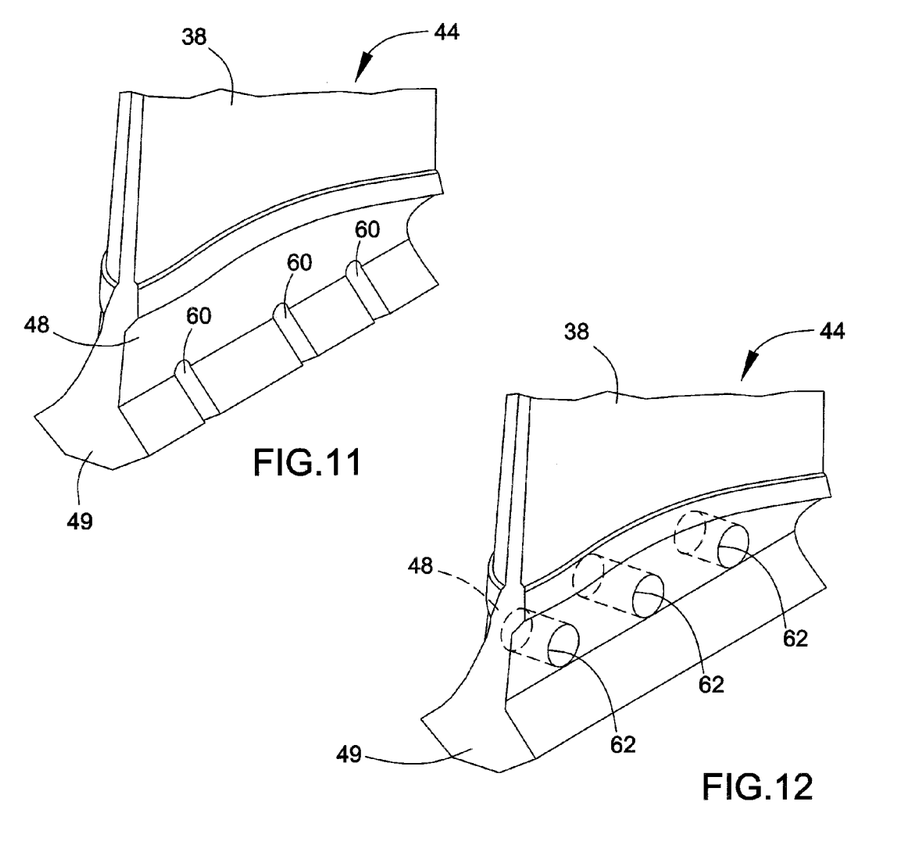
FIGS. 11, 12 and 13 are isolated perspective views of the shank nub of FIG. 3 modified to have slots, holes and protuberances, respectively, for promoting the attachment of the integral platform and dovetail portions to the integral airfoil portion and shank nub.
Figure 13:
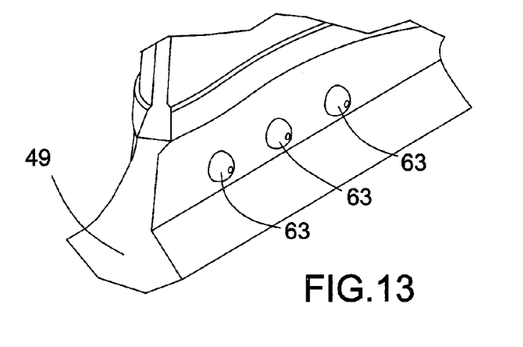

FIGS. 11 and 12 are isolated perspective views of the shank nub 48 of FIG. 3 modified to have slots 60 and holes 62, respectively, for promoting the attachment of the CMC subcomponent 44 to the metallic subcomponent 46. The slots 60 are defined as limited recesses in the shank nub base 49, whereas the holes 62 preferably pass entirely through the shank nub 48 above its base 49. In each case, metallic material enters the slots 60 and/or holes 62 during the casting process, such that solidification of the casting material creates complementary interlocking metallic features (not shown) within the slots 60 and/or holes 62. In the case of the holes 62, the casting material within the holes 62 is also capable of interconnecting those portions of the shank casing 50 separated by the shank nub 48. The interlocking effect physically promotes the retention capability provided by the shank nub base 49, and therefore further promotes a robust mechanical attachment between the subcomponents 44 and 46. Though FIGS. 11 and 12 show the slots 60 and holes 62 as alternative configurations, combinations of slots 60 and holes 62 are also within the scope of the invention. Furthermore, other negative surface features (depressions or recesses) could be defined in the shank nub 48 and/or its base 49 to achieve a similar effect. As depicted in FIG. 13, positive surface features (protuberances) 63 can also be defined in the shank nub 48 and/or its base 49 and, alone or in combination with recesses (such as slots 60 and/or holes 62) employed to achieve a retention effect similar to negative surface features.

Figure 14:
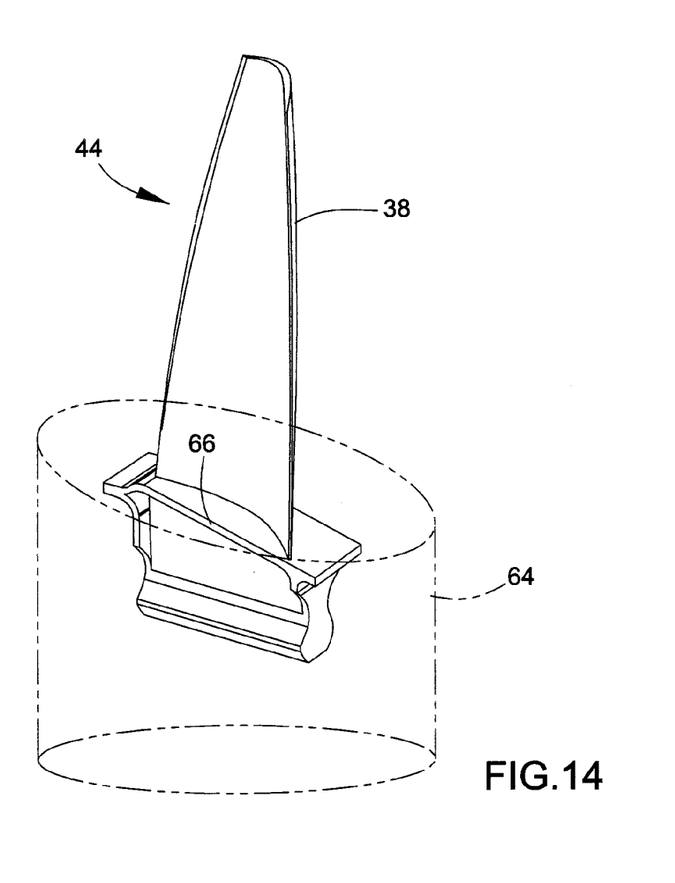
FIG. 14 schematically represents a co-casting process for simultaneously forming and attaching the integral platform and dovetail portions on the integral airfoil portion and shank nub of the blade of FIGS. 2 and 3.

The process of "co-casting" the metallic subcomponent 46 on the CMC subcomponent 44 can be achieved in a variety of ways. FIG. 14 schematically represents a co-casting process for simultaneously forming and attaching the metallic subcomponent 46 and its unitary dovetail, platform and shank portions 32, 36 and 40 on the CMC subcomponent 44 and its unitary airfoil portion 38 and shank nub 48. As represented in FIG. 14, the process may be performed within a mold 64 to produce a casting 66 whose shape approximates the final geometry desired for the dovetail, platform and shank portions 32, 36 and 40, and thereby minimize the amount of post-cast machining required of the casting 66 to produce the subcomponent 46. The mold 64 may be any suitable design, for example, a ceramic shell. Following solidification of the metallic material, the mold 64 can be removed to retrieve the co-cast subcomponent 46 that has been cast in-situ onto the shank nub 48 of the CMC subcomponent 44. Notably, this casting technique is preferably performed to avoid the high temperatures and long time exposures normally required in conventional investment casting processes, which could result in undesirable chemical reactions between the CMC material of the subcomponent 44 and the molten metal material (for example, the formation of silicides), as well as with the mold 64. The process of ramping the shank nub 48 of the CMC component 44 into the molten metallic material within the mold 64 enables the contact time and temperature to be kept to a minimum to prevent undesirable reactions.

Other methods that can be used to form the metallic subcomponent 46 include spin casting techniques. As known in the art, spin casting processes are similar to conventional investment casting processes in the fact that a mold is created by coating a wax replica of the part in ceramic, and then removing the wax to yield a female form the part ("mold"), which is then filled with molten metal that solidifies to form the final part. Spin casting techniques depart from conventional casting methods in that the latter relies on gravitational force to act on a molten metal to fill the mold, whereas the mold in a spin casting process is rotated to induce centrifugal forces that act on the molten metal. This additional force is beneficial to certain casting geometries and/or materials to ensure a complete fill of the mold with acceptable microstructure and lack of internal defects. Spin casting also differs from centrifugal casting processes, in which a molten metal is poured from a crucible into a central pour cup that is aligned with the rotational axis of a rotating mold. The molten metal initially has zero centrifugal force acting upon it, and takes a finite amount of time until it flows away from the center of rotation and slowly picks up centrifugal force. With spin casting, the charge (unmelted raw material) is melted at a distance way from the center of rotation, such that when the charge is melted and rotation starts, the molten metal is immediately acted upon by centrifugal force, resulting in a more rapid fill of the mold than either conventional or centrifugal casting processes.

It should be noted here that the subcomponent 46 depicted in FIG. 5 could be prefabricated and then assembled with the CMC subcomponent 44. For example, the subcomponent 46 can be fabricated as two or more pieces that can be assembled around the shank nub 48 and then welded or brazed to each other to form the complete subcomponent 46. However, this approach would require precision machining to control interface contact stresses between the CMC and metallic subcomponents 44 and 46 and achieve an effective level of compression and encapsulation of the CMC shank nub 48 comparable to that possible with casting techniques. However, an advantage to this approach is the ability to use alloys with melting temperatures that would be otherwise incompatible with the CMC material of the subcomponent 44, for example, due to posing an excessive risk of reactivity or exceeding the temperature capability of the CMC material. With a prefabrication technique, it may be possible to fill gaps between the CMC subcomponent 44 and the individual pieces of the metallic subcomponent 46 during assembly of the pieces. For example, gaps could be filled during the assembly process with a powdered braze filler material, which is then sufficiently melted during brazing to join the pieces of the subcomponent 46 together. Brazing temperatures, for example, in a range of about 2200 to about 2300° F. (about 1200 to about 1260° C.), would be compatible with most CMC materials currently being contemplated for the invention.

Figure 15:
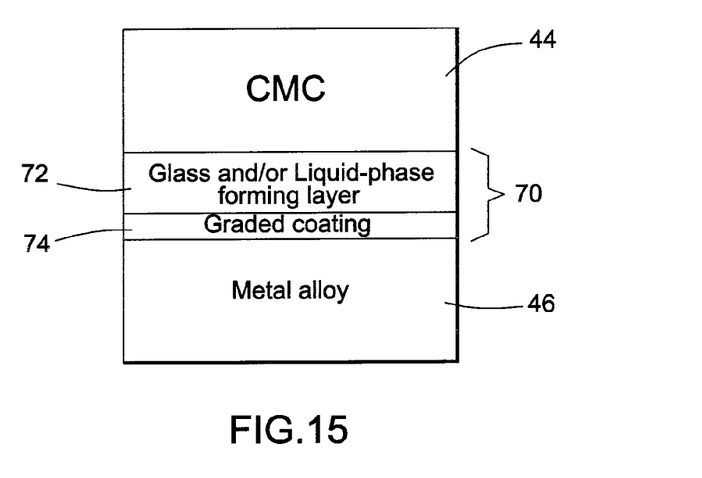
FIG. 15 schematically represents a portion of an interface region between the integral airfoil portion and shank nub and the integral platform and dovetail portions of the blade of FIGS. 2 and 3, and represents a coating system at the interface for inhibiting chemical interactions therebetween.

In addition to or as an alternative to relying on the casting technique to minimize undesirable chemical reactions between the CMC material of the subcomponent 44 and the molten metal material of the subcomponent 46, the present invention also contemplates the use of interface coatings provided between the CMC and metallic subcomponents 44 and 46. In addition or alternatively, an interface coating can be employed to enhance thermal expansion compliance for the shrinkage of the metal around the CMC subcomponent 44 during solidification to reduce the incidence of cold cracking. FIG. 15 schematically represents a portion of an interface region between the CMC and metallic subcomponents 44 and 46 of the blade of FIGS. 2 and 3, and represents a coating system 70 at the interface for inhibiting chemical interactions therebetween. The coating system 70 can be produced to have any number of coating layers formed of a variety of different materials, and can be deposited with the use of a variety of processes, including slurry coating, air plasma spraying (APS), and so forth. In FIG. 15, the coating system 70 is represented as comprising two distinct layers 72 and 74, though the coating system 70 could be formed by a single layer or more than two layers, as an example, five layers. The layer 72 directly contacting the CMC subcomponent 44 may be formed by, for example, a material that is particularly compatible with the material of the CMC subcomponent 44, for example, a glass and/or liquid-phase forming material. Examples of potential glass materials for the layer 72 include materials described for a reaction barrier coating disclosed in U.S. patent application Ser. No. 12/984,836 to Shyh-Chin Huang et al., whose contents regarding the reaction barrier coating are incorporated herein by reference. The layer 74 directly contacting the metallic subcomponent 46 may be formed by, for example, a material that provides a suitable transition between the layer 72 and the metallic subcomponent 46 in terms of chemical and physical compatibility. For example, the layer 74 may have a graded composition in which its composition immediately adjacent the layer 72 is the same as or otherwise compatible with the glass and/or liquid-phase forming material of the layer 72, while its composition immediately adjacent the subcomponent 46 is the same as or otherwise compatible with the metallic material used to form the subcomponent 46. For example, the layer 74 or at least its composition immediately adjacent the subcomponent 46 may contain or consist of a ductile metal foam material that is chemically compatible with the metallic material of the subcomponent 46 and provides thermal expansion compliance between the CMC and metallic subcomponents 44 and 46. Suitable materials for the foam material are believed to include high-temperature oxidation-resistant alloys such as iron-, cobalt- and nickel-based alloys, notable but nonlimiting examples of which include FeCrAlY alloys of types known in the art. In combination, the layers 72 and 74 preferably confer a degree of compliance to the coating system 70, enabling the coating system 70 to serve as a compliant interface that accommodates shrinkage of the metal subcomponent 46 around the CMC subcomponent 44 during solidification. Generally speaking, thicknesses of about 0.005 to about 0.040 inch (about 0.1 to 1 millimeter) are believed to be suitable for the coating system 70, though lesser and greater thicknesses are also foreseeable.

FIGS. 16 and 17 represent an LPT turbine blade 80 that is shrouded, whereas the blade 30 in FIGS. 2 through 15 is unshrouded. The blade 80 comprises a CMC subcomponent 82 that defines an airfoil portion 84. The blade further comprises a dovetail portion 86 and a platform portion 88. Optionally, the CMC subcomponent 82 may be formed to have a shank nub (not shown) surrounded by a metallic subcomponent that defines the dovetail and platform portions 86 and 88, generally in a manner similar to that described for the blade 30. Contrary to the blade 30, the blade 80 represented in FIGS. 16 and 17 comprises a metallic subcomponent 90 that defines a shroud portion 92 at the tip of the CMC airfoil portion 84, which effectively defines a nub 94 for attachment of the shroud portion 92 to the airfoil portion 84. The metallic subcomponent 90 is further represented as defining an integrated seal tooth 96. The metallic subcomponent 90 can be formed in the same manner as that described for the metallic subcomponent 46 of the blade 30.

Figure 18:
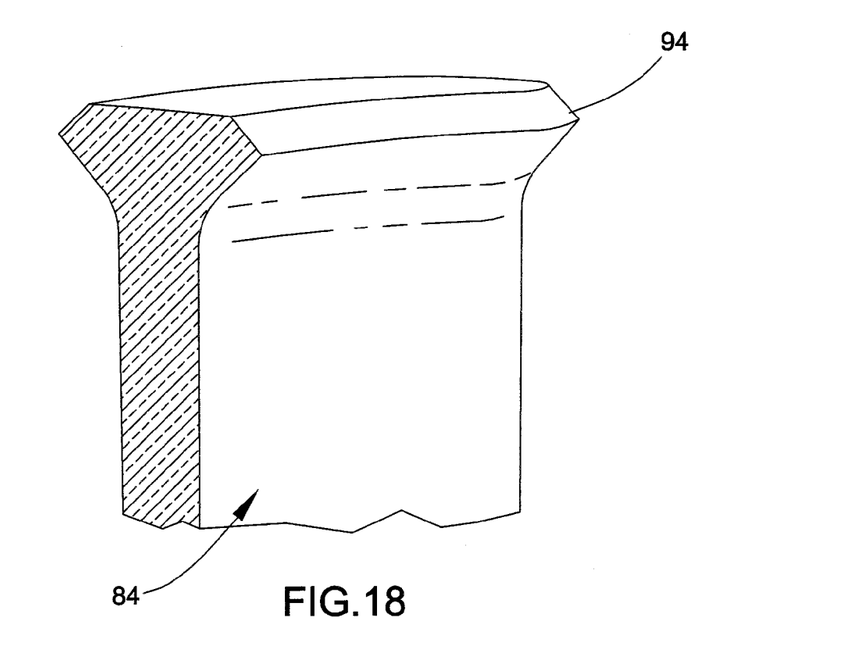
FIG. 18 is a more detailed cross-sectional view of the blade tip nub represented in FIG. 17.
Figure 19:
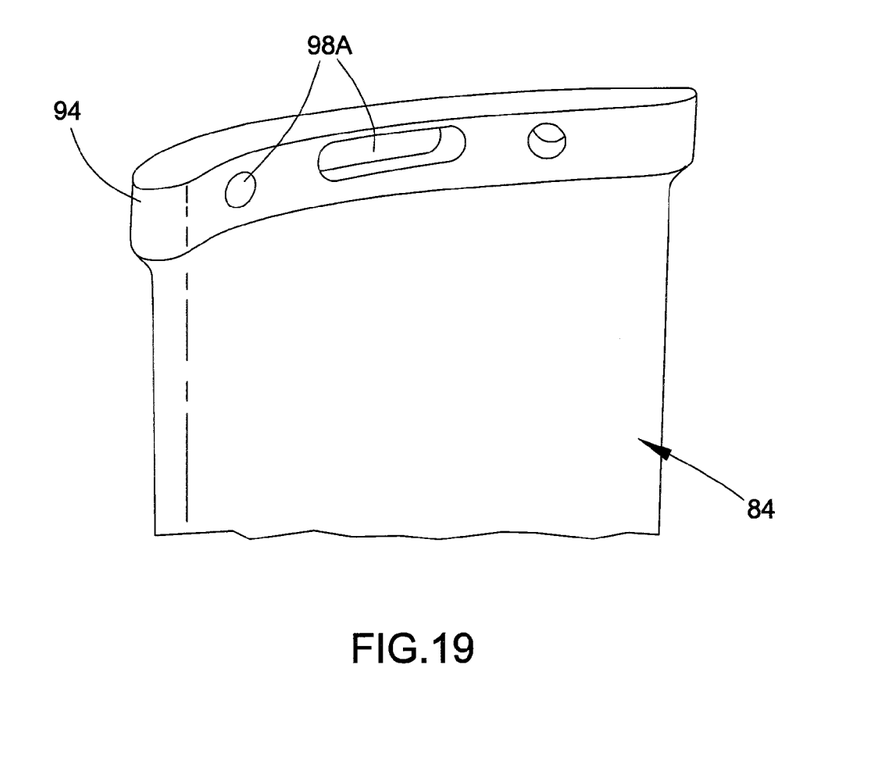
FIGS. 19, 20 and 21 are detailed cross-sectional views showing blade tip nubs in accordance with other embodiments of the present invention.
Figure 20:
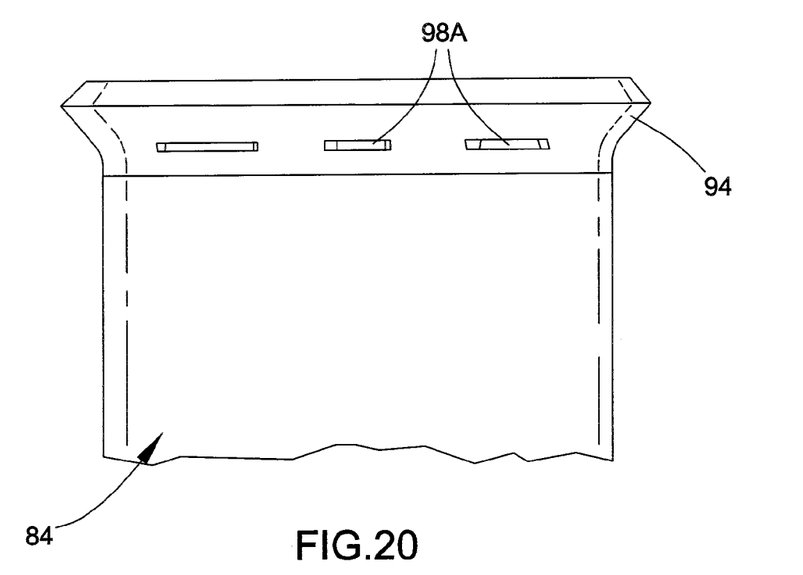
Figure 21:
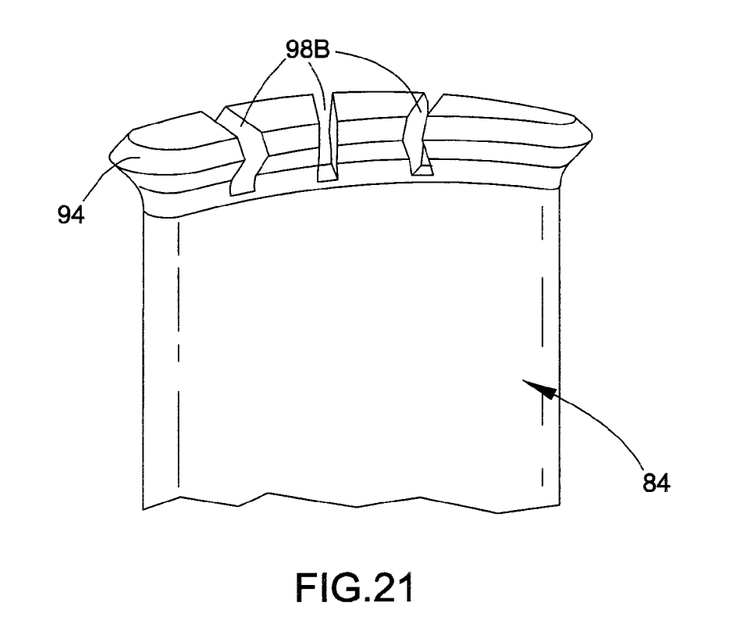

As evident from FIGS. 17 and 18, the blade tip nub 94 can have a shape similar to the shank nub 48 depicted in FIGS. 4 and 6-13, for the blade 30. In particular, the blade tip nub 94 is wider in cross-section than the immediately adjacent region of the airfoil portion 84, and serves to assist in the retention of the metallic subcomponent 90 and its shroud portion 92 at the tip of the CMC airfoil portion 84. Also similar to the shank nub 48, the blade tip nub 94 can further incorporate positive and negative surface features that, during the co-casting process to produce the metallic subcomponent 90 and its shroud portion 92, result in the creation of integral complementary interlocking metallic features. As represented in FIGS. 19, 20 and 21, the nub 94 can have through-holes 98A (FIGS. 19 and 20) and/or slots 98B (FIG. 21) of various sizes and shapes. In the case of the through-holes 98A, metallic material enters the holes 98A during the casting process, such that solidification of the casting material creates complementary interlocking metallic crossbars that extend entirely through the holes 98A to interconnect portions of the shroud portion 92 separated by the nub 94. In the case of the slots 98B, the casting material within the slots 98B creates complementary interlocking metallic ribs that extend entirely through the slots 98B to interconnect portions of the shroud portion 92 separated by the nub 94. The interlocking effect physically promotes the retention capability provided by the nub 94, and therefore further promotes a more robust mechanical attachment between the CMC and metallic subcomponents 82 and 90. Though FIGS. 19 through 21 represent only negative surface features, positive surface features (protuberances) could be defined in the nub 94 as an alternative or in addition to the holes 98A and/or slots 98B to achieve a retention effect similar to negative surface features.

Figures 22, 23, 24, 25:
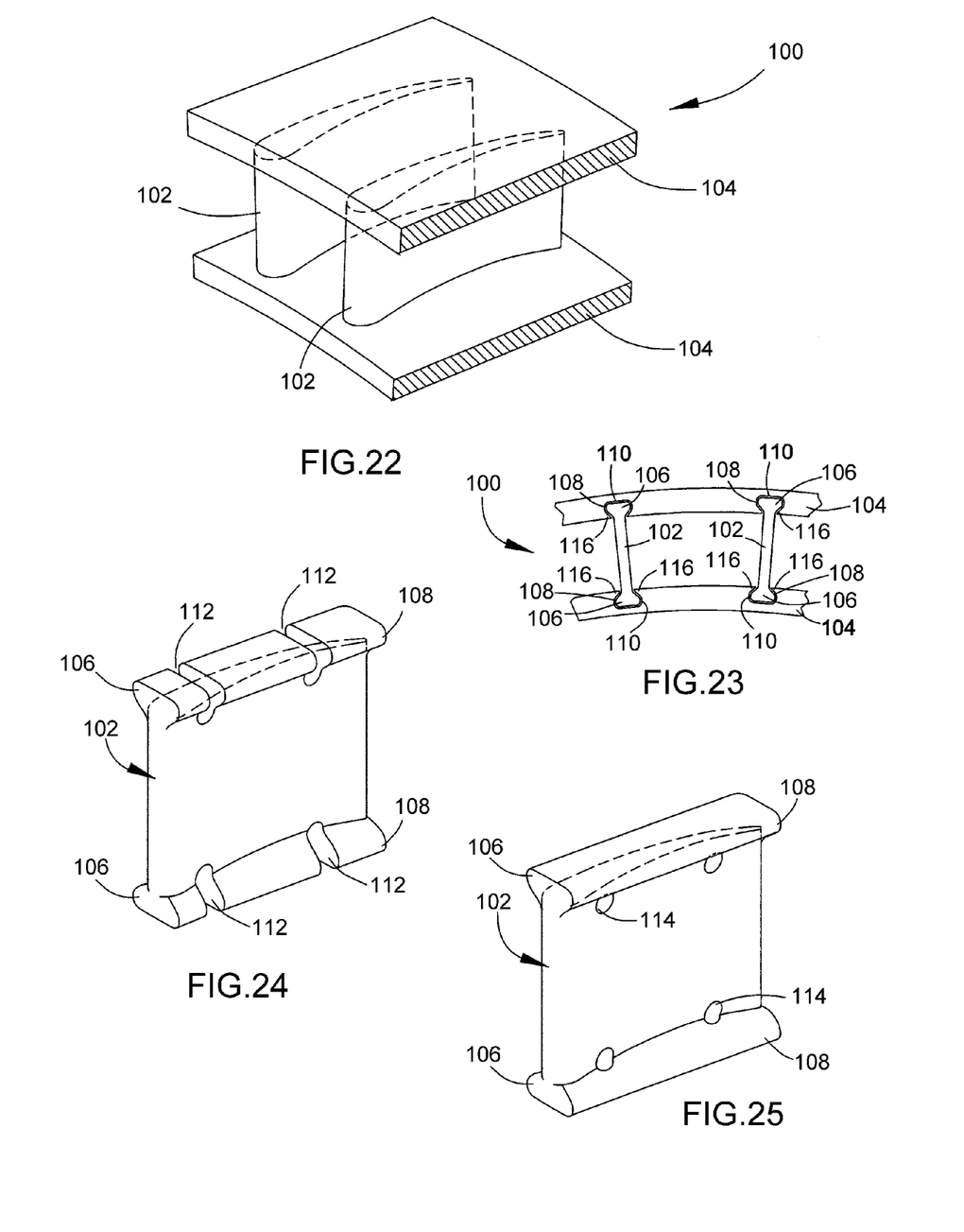
FIG. 22 is a perspective view schematically representing a turbine vane having airfoil portions formed of a CMC material and platform portions formed of a metallic material in accordance with another embodiment of the present invention.
FIG. 23 is a side view schematically representing the turbine vane of FIG. 22, and showing each airfoil portion as having integral shank nubs received within pockets of the platform portions.
FIGS. 24 and 25 are isolated perspective views of one of the shank nubs of FIG. 23 modified to have slots and holes, respectively, for promoting the attachment of the platform portions to the airfoil portions.

FIGS. 22 and 23 represent a gas turbine vane segment 100 as another suitable application for the present invention. The vane segment 100 is represented as having two airfoil portions (vanes) 102 between a pair of inner and outer platforms (bands) 104, though a single airfoil portion 102 or more than two airfoil portions 102 could be present. The vane segment 100 is one of a number of vane segments that are assembled together to form an annular-shaped vane assembly of a turbine engine. The airfoil portions 102 are excellent candidates for being produced from ceramic-based materials because they are directly exposed to hot combustion gases and have generally linear geometries. For this reason, each vane airfoil portion 102 can be produced as a unitary piece from a ceramic-based material, for example, a CMC material, and one or both of the platforms 104 can be produced from materials other than a ceramic material. As represented in FIG. 23, each airfoil portion 102 comprises a pair of oppositely-disposed nubs 106. Each nub 106 is effectively a dovetail feature that defines an oppositely-disposed pair of tangs 108. Furthermore, the nubs 106 are entirely encased in the material used to form the platforms 104 so that the nubs 106 and their tangs 108 are received within pockets 110 that were defined in the platforms 104 during a metal casting process used to form the platforms 104. As evident from FIG. 23, each nub 106 and its tangs 108 define a region on the airfoil portion 102 that is wider in cross-section than the immediately adjacent region of the airfoil portion 102, and as such the nubs 106 are configured to serve as retention features for retaining the inner and outer platforms 104 on the airfoil portion 102, as well as retain the nubs 106 within the pockets 110 of the platforms 104. Other aspects regarding the production of the vane assembly 100 can be appreciated from the discussions above regarding the turbine blades 30 and 80 of FIGS. 3 through 21.

FIGS. 24 and 25 are isolated perspective views of the airfoil portions 102 of FIG. 23 whose nubs 106 have been modified to include slots 112 and holes 114, respectively, for promoting the attachment of the airfoil portions 102 to the metallic platforms 104. As with the slots 60 and holes 62 discussed in reference to FIGS. 11 and 12, during the process of casting the platforms 104 around the nubs 106, metallic material enters the slots 112 and/or holes 114 such that solidification of the casting material creates complementary interlocking metallic features (not shown) within the slots 112 and/or holes 114. In the case of holes 114, the casting material within the holes 114 is also capable of interconnecting those portions 116 of the platforms 104 separated by the nubs 106. The interlocking effect physically promotes the retention capability provided by the nubs 106 and their tangs 108, and therefore further promotes a robust mechanical attachment between the airfoil portions 102 and the platforms 106. Though FIGS. 24 and 25 show the slots 112 and holes 114 as alternative configurations, combinations of slots 112 and holes 114 are also within the scope of the invention. Furthermore, other negative surface features (depressions or recesses) could be defined in the nubs 106 to achieve a similar effect, and positive surface features (not shown) could also be defined in the nubs 106, similar to the protuberances 63 of FIG. 13.

While the invention has been described in terms of specific embodiments, it is apparent that other forms could be adopted by one skilled in the art. Therefore, the scope of the invention is to be limited only by the following claims.

The invention claimed is:

1. A turbine airfoil component of a gas turbine engine, the airfoil component being a turbine blade comprising:
   a first subcomponent comprising an airfoil portion and a nub, the nub comprising a base that has outer surfaces, the outer surfaces of the base defining a cross-section of the base that is wider than a region of the nub adjacent the airfoil portion, the first subcomponent being formed of a ceramic-based material and the airfoil portion and the nub being a unitary piece of the ceramic-based material; and
   a second subcomponent comprising a casting formed and attached to the first subcomponent by casting a molten metallic material in-situ around the nub of the first subcomponent, the second subcomponent comprising a platform portion between the airfoil portion and the nub of the first subcomponent and a dovetail portion on the nub of the first subcomponent and adapted for anchoring the airfoil component to a turbine disk, each of the platform portion and the dovetail portion having at least one off-axis geometric feature that results in the second subcomponent having a more complex geometry than the first subcomponent, the dovetail portion of the second subcomponent having:
   a shank casing that completely encases the nub so that the region of the nub adjacent the airfoil portion is covered by a nonconformal portion of the shank casing and so that the base of the nub is entirely covered by a conformal portion of the shank casing having an exterior surface that conforms to the outer surfaces of the base, the off-axis geometric feature of the dovetail portion comprising a first set of oppositely-disposed tangs that are exclusively defined by the nonconformal portion of the shank casing and protrude from the region of the nub adjacent the airfoil portion, the off-axis geometric feature of the dovetail portion comprising a second set of oppositely-disposed tangs that are exclusively defined by the base of the nub and by the conformal portion of the shank casing thereon, the conformal portion of the shank casing defining a pressure face on each of the second set of oppositely-disposed tangs.

2. The turbine airfoil component according to claim 1, wherein the attachment of the second subcomponent to the first subcomponent comprises a compression fit of the second subcomponent on the nub of the first subcomponent resulting from the metallic material contracting more than the ceramic-based material during solidification of the molten metallic material so that the nub is in compression and the second subcomponent surrounding the nub is in tension.

3. The turbine airfoil component according to claim 1, wherein the ceramic-based material is chosen from the group consisting of homogeneous ceramic materials and ceramic matrix composite materials containing a discontinuous and/or continuous ceramic reinforcement material in a ceramic matrix reinforcement material.

4. The turbine airfoil component according to claim 1, wherein the ceramic-based material is a ceramic matrix composite material containing a continuous ceramic reinforcement material in a ceramic matrix reinforcement material, and at least one of the ceramic reinforcement material and the ceramic matrix material comprises silicon carbide.

5. The turbine airfoil component according to claim 1, wherein the ceramic-based material is a ceramic matrix composite material containing a discontinuous ceramic reinforcement material in a ceramic matrix reinforcement material, and at least one of the ceramic reinforcement material and the ceramic matrix material comprises silicon carbide.

6. The turbine airfoil component according to claim 1, further comprising at least one slot in a surface region of the nub, wherein some of the metallic material is within the slot and interlocks the second subcomponent to the first subcomponent.

7. The turbine airfoil component according to claim 1, further comprising at least one hole through the nub, wherein some of the metallic material is within the hole and interconnects regions of the second subcomponent that are separated by the nub.

8. The turbine airfoil component according to claim 1, wherein the off-axis geometric feature of the dovetail portion comprises at least one tang that protrudes from the dovetail portion and a pressure face on the tang.

9. The turbine airfoil component according to claim 1, wherein the second subcomponent is entirely a unitary metallic casting.

10. The turbine airfoil component according to claim 1, further comprising a shroud portion comprising a casting formed and attached to the first subcomponent by casting a second molten metallic material in-situ around the airfoil portion of the first subcomponent.

11. The turbine airfoil component according to claim 1, further comprising a coating system on the nub that inhibits chemical reactions between the metallic material of the second subcomponent and the ceramic-based material of the first subcomponent, wherein the coating system comprises at least two distinct layers, a first layer of the two distinct layers directly contacting the first subcomponent and a second layer of the two distinct layers directly contacting the second subcomponent, the first layer being chemically and physically compatible with the ceramic-based material of the first subcomponent and the second layer being a transition layer between the first layer and the metallic material of the second subcomponent and being chemically and physically compatible with the metallic material of the second subcomponent.

12. A turbine airfoil component of a gas turbine engine, the airfoil component being a blade comprising:
a first subcomponent comprising an airfoil portion and a nub that is located on the shank portion and has a base having outer surfaces, the outer surfaces of the base defining a cross-section that is wider than an immediately adjacent region of the nub adjacent the airfoil portion, the first subcomponent being a unitary piece of a ceramic-based material; and
a second subcomponent comprising a casting formed and attached to the first subcomponent by casting a molten metallic material in-situ around the base of the nub of the first subcomponent such the nub is entirely encased within the metallic material that forms the second subcomponent and the second subcomponent is retained on the first subcomponent by a compression fit on the wider cross-section of the nub, the second subcomponent comprising a platform portion between the airfoil portion and the nub of the first subcomponent and a dovetail portion on the nub of the first subcomponent and adapted for anchoring the airfoil component to a turbine disk, each of the platform portion and the dovetail portion having at least one off-axis geometric feature that results in the second subcomponent having a more complex geometry than the first subcomponent, the dovetail portion of the second subcomponent having:
a shank casing that completely encases the nub so that the region of the nub adjacent the airfoil portion is covered by a nonconformal portion of the shank casing and so that the base of the nub is entirely covered by a conformal portion of the shank casing having an exterior surface that conforms to the outer surfaces of the base, the off-axis geometric feature of the dovetail portion comprising a first set of oppositely-disposed tangs that are exclusively defined by the nonconformal portion of the shank casing and protrude from the region of the nub adjacent the airfoil portion, the off-axis geometric feature of the dovetail portion comprising a second set of oppositely-disposed tangs that are exclusively defined by the base of the nub and by the conformal portion of the shank casing thereon, the conformal portion of the shank casing defining a pressure face on each of the second set of oppositely-disposed tangs.

13. The turbine airfoil component according to claim 12, wherein the off-axis geometric feature comprises at least one tang that protrudes from the dovetail portion and a pressure face on the tang.

14. The turbine airfoil component according to claim 12, wherein the second subcomponent is entirely a unitary metallic casting.

* * * * *